(12) United States Patent
Chuang et al.

(10) Patent No.: US 11,394,633 B2
(45) Date of Patent: Jul. 19, 2022

(54) INTERNET OF THINGS (IOT) DEVICE AND SOLUTION CERTIFICATION AS A SERVICE

(71) Applicant: Microsoft Technology Licensing, LLC, Redmond, WA (US)

(72) Inventors: Tun-Jan Chuang, Redmond, WA (US); Devis Lucato, Kirkland, WA (US); Timothy Alan Laverty, Redmond, WA (US); Prasanna Chromepet Padmanabhan, Redmond, WA (US); Koichi Hirao, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/276,340

(22) Filed: Feb. 14, 2019

(65) Prior Publication Data

US 2020/0195545 A1  Jun. 18, 2020

Related U.S. Application Data

(60) Provisional application No. 62/779,040, filed on Dec. 13, 2018.

(51) Int. Cl.
*G06F 15/16* (2006.01)
*H04L 43/50* (2022.01)
(Continued)

(52) U.S. Cl.
CPC .......... *H04L 43/50* (2013.01); *H04L 41/0809* (2013.01); *H04L 41/0869* (2013.01)

(58) Field of Classification Search
CPC . H04L 43/50; H04L 41/0809; H04L 41/0869; H04L 67/143; H04L 67/10;
(Continued)

(56) References Cited

U.S. PATENT DOCUMENTS 6,453,461 B1 * 9/2002 Chaiken ................ G06F 9/4411
713/1
9,590,872 B1  3/2017 Jagtap et al.
(Continued)

OTHER PUBLICATIONS

A software Defined Device Provisioning Framework Facilitating Scalability in Internet of things, University Bristol, Jul. 1, 2018 (Year: 2018).*

(Continued)

*Primary Examiner* — David R Lazaro
*Assistant Examiner* — Mariegeorges A Henry
(74) *Attorney, Agent, or Firm* — Ray Quinney & Nebeker; Tiffany Healy

(57) ABSTRACT

Methods and devices for an automated Internet of Things (IoT) certification service to verify plug and play capabilities of one or more IoT devices for use with a cloud service provider may include receiving a device identification of an IoT device to certify with the cloud service provider. The methods and devices may include receiving a selection of one or more certification tests to perform to plug and play capabilities of the IoT device. The methods and devices may include performing the one or more certification tests. The methods and devices may include generating a device certification for the plug and play capabilities of the IoT device in response to the one or more certification tests passing.

18 Claims, 11 Drawing Sheets

(51) Int. Cl.
    *H04L 41/0869* (2022.01)
    *H04L 41/0806* (2022.01)
(58) Field of Classification Search
    CPC ..... H04L 43/10; H04L 63/0272; H04L 63/20;
        H04L 63/164; H04W 84/12; G16Y 40/10;
        G16Y 40/20; G16Y 40/40
    USPC ................................................ 709/220, 222
    See application file for complete search history.

(56) References Cited

U.S. PATENT DOCUMENTS

| | | | | |
|---|---|---|---|---|
| 9,860,177 | B2* | 1/2018 | Kosseifi | H04L 47/125 |
| 2002/0183956 | A1* | 12/2002 | Nightingale | H04L 43/50 |
| | | | | 702/120 |
| 2005/0154553 | A1* | 7/2005 | Wheeler | H04L 12/2809 |
| | | | | 702/123 |
| 2014/0236515 | A1* | 8/2014 | Ho | G06Q 10/04 |
| | | | | 702/84 |
| 2015/0288528 | A1* | 10/2015 | Cho | H04L 9/3268 |
| | | | | 713/158 |
| 2016/0328719 | A1 | 11/2016 | Ananchaperumal et al. | |
| 2017/0054571 | A1 | 2/2017 | Kitchen et al. | |
| 2017/0201585 | A1* | 7/2017 | Doraiswamy | H04L 67/2804 |
| 2018/0035248 | A1* | 2/2018 | Soave | H04W 12/04 |
| 2018/0077012 | A1 | 3/2018 | Tellado et al. | |
| 2019/0068461 | A1* | 2/2019 | Barkie | H04M 15/58 |

OTHER PUBLICATIONS

"AWS IoT Device Tester for Amazon FreeRTOS User Guide", Retrieved From: https://docs.aws.amazon.com/freertos/latest/userguide/freertos-ug.pdf, Jan. 10, 2019, 20 Pages.
"AWS IoT Device Tester for Amazon FreeRTOS User Guide", Retrived From: https://docs.aws.amazon.com/freertos/latest/userguide/freertos-ug.pdf, Jan. 10, 2019, 220 Pages.
"AWS Partner Device Catalog", Retrieved From: https://devices.amazonaws.com/, Dec. 12, 2018, 4 Pages.
"Device Security", Retrieved From: https://web.archive.org/web/20180121200646/https://cloud.google.com/iot/docs/concepts/device-security, Jan. 21, 2018, 3 Pages.
Hirao, "Streamlined IoT device certification with Azure IoT certification service", Retrieved From: https://azure.microsoft.com/en-in/blog/streamlined-iot-device-certification-with-azure-iot-certification-service/, Dec. 13, 2018, 7 Pages.
Kingatua, "IoT System Tests :: Checking for Failure", Retrieved From: https://medium.com/supplyframe-hardware/iot-system-tests-checking-for-failure-c146d2ebb8ef, Jun. 11, 2018, 13 Pages.
Tsigkogiannis, "Announcing kit certification for Microsoft Azure Certified for IoT", Retrieved From: https://azure.microsoft.com/en-us/blog/announcing-kit-certification-for-microsoft-azure-certified-for-iot/, May 10, 2017, 5 Pages.
"International Search Report and Written Opinion Issued in PCT Application No. PCT/US2019/064086", dated Mar. 12, 2020, 10 Pages.

* cited by examiner

INTERNET OF THINGS (IOT) DEVICE AND SOLUTION CERTIFICATION AS A SERVICE

RELATED APPLICATION

This application claims priority to U.S. Application No. 62/779,040 titled "Internet of Things (TOT) Device and Solution Certification as a Service," filed Dec. 13, 2018, which is incorporated herein by reference in its entirety.

BACKGROUND

The present disclosure relates to computer devices and certification of Internet of Things (IoT) devices for use with cloud service providers.

When using IoT devices with cloud service providers, a certification process may help IoT solution developers to select the right set of IoT hardware devices for their business problem. Current certification programs for IoT devices are performed manually. As such, the certification process may be lengthy, confusing, and may lead to inconsistent quality management.

Thus, there is a need in the art for improvements in certifying IoT devices for use with cloud service providers.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory. The processor may be configured to execute an Internet of Things (IoT) certification service operable to: receive a device identification of an IoT device to certify with a cloud service provider; receive a selection of one or more certification tests to perform to verify plug and play capabilities of the IoT device; perform the one or more certification tests; and generate a device certification for the plug and play capabilities of the IoT device in response to the one or more certification tests passing.

Another example implementation relates to a method for an automated Internet of Things (IoT) certification service to verify plug and play capabilities of one or more IoT devices for use with a cloud service provider. The method may include receiving a device identification of an IoT device to certify with the cloud service provider. The method may include receiving a selection of one or more certification tests to perform to verify plug and play capabilities of the IoT device. The method may include performing the one or more certification tests. The method may include generating a device certification for the plug and play capabilities of the IoT device in response to the one or more certification tests passing.

Another example implementation relates to computer-readable medium storing instructions executable by a computer device. The computer-readable medium may include at least one instruction for causing the computer device to receive a device identification of an IoT device to certify with a cloud service provider. The computer-readable medium may include at least one instruction for causing the computer device to receive a selection of one or more certification tests to perform to verify plug and play capabilities of the IoT device. The computer-readable medium may include at least one instruction for causing the computer device to perform the one or more certification tests. The computer-readable medium may include at least one instruction for causing the computer device to generate a device certification for the plug and play capabilities of the IoT device in response to the one or more certification tests passing.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
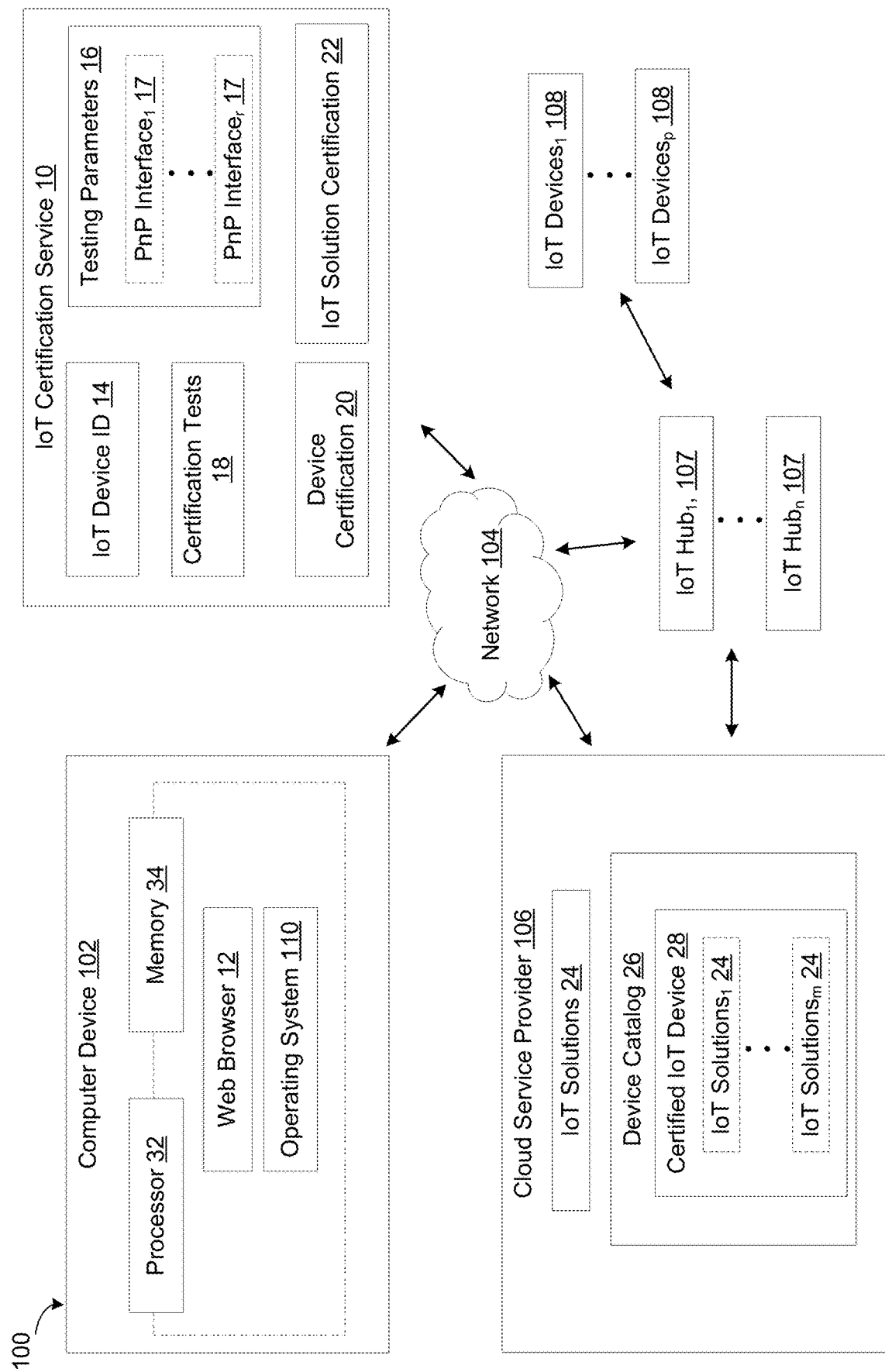
FIG. 1 is a schematic block diagram of an example computer device in accordance with an implementation of the present disclosure.

This disclosure relates to devices and methods for an automated IoT certification service to verify compatibility of IoT devices for use with a cloud service provider. In an implementation, the cloud service provider may be the AZURE™ cloud computing service. The IoT certification service may make it easier for IoT solution developers to select the right set of IoT hardware devices for their business problems and/or business solutions when implementing IoT solutions.

Current certification programs for IoT devices may be performed manually. For example, the IoT device may be shipped to a testing center for further testing before certifying the IoT device as compatible with the cloud service provider. Another example may include hardware manufacturers receiving step-by-step instructions from a consultant for certifying the IoT device by manually providing the cloud service infrastructure, such as, the cloud gateway and subsequently provisioning their IoT devices. As such, the certification process may be lengthy and confusing. In addition, the certification process may be expensive. For example, the consultant budget for consulting with the hardware manufacturers may be significant.

The devices and methods of the present solution may simplify device certification through an automated certification service for certificating IoT devices for use with a cloud service provider. Moreover, the devices and methods may eliminate subscription costs for hardware manufacturers and streamline the certification processes through automation. By automating the certification process, quality and consistency may be improved as compared to the manual processes that are currently being used.

The described devices and methods may support validation of a variety of IoT hub primitives, such as, device messaging (e.g., device-to-cloud messaging, cloud-to-device messaging, direct-method messaging), validation of device twins, and/or validation of direct methods. Current certification programs for IoT devices may not adequately vet device truths and/or capabilities. For example, current certification programs may only verify device-to-cloud messaging and may ignore differentiated capabilities, such as, but not limited to, cloud-to-device messaging, device twin properties, method commands, security, and/or provisioning devices via Device Provisioning Service (DPS). In addition, the current certification programs may also be easy to fake and/or short-circuit to avoid the cost of certifying each IoT device, especially, for example, when a hardware manufacturer has a number of IoT devices to submit. For example, currently once the hardware manufacturer submits a screenshot showing a single device-to-cloud telemetry message coming over to the IoT Hub, the IoT device may be certified.

The described devices and methods may also provide certification support for newly emerging hardware, such as, but not limited to, microcontroller unit (MCU)s and constrained devices. Previously, hardware manufacturers were required to use IoT device software development kits (SDKs) to build an application to establish connectivity from device(s) to the cloud services, for example, managed by AZURE IoT Hub services. However, constrained devices and tiny MCUs are not capable of running IoT device SDKs. The devices and methods may support IoT devices that do not use IoT device SDK to establish connectivity to IoT Hubs, such as, but not limited to, IoT devices that use the IoT Hub resource provider REST API to create and manage IoT Hub programmatically. Hardware manufacturers may opt to use other device SDK equivalents to establish connectivity to IoT Hubs. Many device manufacturers may choose not to use the SDK because of the memory footprint and other requirements, such as, the use of malloc( ) to allocate memory within our SDK, which is not supported on constrained hardware.

In addition, the described devices and methods may also provide matchmaking, allowing customers to easily find the right IoT device for a given business problem and/or business solution. Currently, device catalogs may list certified IoT devices that are compatible with the cloud service provider. However, the device catalogs simply show hardware specifications for the IoT devices. The hardware catalogs do not provide information identifying which IoT solutions the IoT devices may be compatible with and/or information recommending IoT devices for use with respective IoT solutions. The methods and devices may provide a device catalogue that includes a list of certified IoT devices and one or more associated and/or recommended cloud services for use with the certified IoT device.

The described devices and methods may also certify an IoT device for plug and play (PnP) capabilities. The devices and methods may identify which plug and play interfaces the IoT device implements and may validate functionality against the identified interfaces. Upon completion of the certification tests, the devices and methods may certify the IoT device for plug and play capabilities.

The devices and methods of the present solution may also provide one or more certifications for IoT solutions. For example, the devices and methods may validate whether the IoT solution consumes plug and play (PnP) interfaces methods exposed by the IoT Hub, and if so, what interfaces the IoT solutions consume. By certifying one or more IoT solutions, developers may be able to select one or more IoT solutions for solving a business problem with confidence that the IoT solution works as expected.

The described devices and methods may also provide tooling in Visual Studio (VS) Code for embedded firmware developers to easily run certification tests for IoT devices and/or IoT solutions.

As such, the present devices and methods may significantly reduce the operational processes and/or engineering costs for hardware manufacturers to certify their IoT devices for use with a cloud service provider. In addition, the described methods and devices may improve the discovery of certified devices in an IoT device catalog. The methods and devices may also expand the information provided in the IoT device catalog to showcase the right set of IoT devices for a users' industry specific vertical solutions and/or to simplify IoT device development.

Referring now to FIG. 1, a system 100 for use with an automated IoT certification service 10 may be operable to verify compatibility of one or more IoT devices 108 for use with one or more cloud service providers 106. IoT devices 108 may include, but are not limited to, computing devices, gaming devices, home management systems or controllers, multimedia devices, washer/dryers, thermostats, ovens, televisions, refrigerators, dish washers, microwaves, alarms, routers, coffee makers, cameras, cellular telephones, speakers, music devices, and/or any other type of Internet of Things (IoT) devices.

IoT certification service 10 may run one or more certification tests 18 on a selected set of IoT devices 108 to validate that IoT devices 108 operate as expected with one or more cloud service providers 106. For example, certification tests 18 may ensure that the communications between IoT devices 108 and the cloud service provider 106 result in the expected results. Upon completion of the certification tests 18, IoT certification service 10 may provide a device certification 20 to the IoT device 108. A device catalog 26 may include a list of certified IoT devices 28 along with device properties of the certified IoT devices 28 and/or any associated IoT solutions 24 that the certified IoT device 28 may be used in connection with. As such, the device catalog 26 may showcase the certified IoT devices 28 to make it easier for device seekers to identify certified IoT devices 28 when building IoT solutions.

IoT certification service 10 may be a web-based test automation workflow that can work on any operating systems 110 of computer devices 102 and/or with any web browsers 12. Operating system 110 and web browsers 12 may be executed by processor 32 and/or memory 34. Memory 34 of computer device 102 may be configured for storing data and/or computer-executable instructions defining and/or associated with operating system 110, and processor 32 may execute such data and/or instructions to instantiate operating system 110. An example of memory 34 can include, but is not limited to, a type of memory usable by a computer, such as random access memory (RAM), read only memory (ROM), tapes, magnetic discs, optical discs, volatile memory, non-volatile memory, and any combination thereof. An example of processor 32 can include, but is not limited to, any processor specially programmed as described herein, including a controller, microcontroller, application specific integrated circuit (ASIC), field programmable gate array (FPGA), system on chip (SoC), or other programmable logic or state machine.

For example, users of computer device 102 may access the IoT certification service 10 through one or more web browsers 12 operating on computer device 102. Users may include, but are not limited to, IoT solution developers and/or original equipment manufacturers.

IoT certification service 10 may receive one or more device identifications IDs 14 of one or more IoT device 108 to certify. For example, a hardware manufacturer or distributor may want to certify an IoT device 108, such as, a field gateway device or an IoT capable leaf device. A user may select one or more device IDs 14 for testing through a dashboard interface of IoT certification service 10 and/or may input the device IDs 14 through the dashboard interface.

IoT certification service 10 may customize the one or more certification tests 18 performed on the IoT devices 108. For example, a user may select which certification tests 18 the user wants run on the selected IoT device 108. IoT certification service 10 may receive testing parameters 16 that identify one or more device capabilities for the selected certification tests 18. Testing parameters 16 may include, but are not limited to, a selection of operating systems supported by the IoT devices, device twin properties of the IoT devices, a selection of device messaging to test (e.g., device-to-cloud messaging, cloud-to-device messaging, and direct method messaging from the device), and/or a number of messages of telemetry data sent from the IoT devices. In addition, testing parameters 16 may include one or more PnP interfaces 17 (up to r, where r is an integer) provided by IoT devices 108 and/or used by IoT solutions 24. Previous certification programs only performed testing against bi-directional connectivity from an IoT device 108 to an IoT Hub 107 cloud service (namely device-to-cloud messaging and cloud-to-device messaging). However, certification tests 18 may also support validation of device twins and/or direct methods IoT hub primitives in response to IoT devices becoming more intelligent and supporting more capabilities. As such, IoT certification service 10 may provide the flexibility to configure each test performed on the IoT devices 108. The device catalog 26 may correspondingly showcase the IoT device capabilities and/or the certification tests 18 performed on the IoT devices 108 making it easy for device seekers to build IoT solutions using these rich capabilities.

IoT certification service 10 may communicate with its own set of IoT hubs 107 (up to n, where n is an integer) to automatically validate IoT devices 108 to the IoT hubs 107 bi-directional connectivity and/or other IoT hubs 107 primitives. The embedded firmware on the IoT device 108 may need to be recompiled to point to the IoT Hub 107 instance via, for example, the connection string. In an implementation, if the user is a pure hardware manufacturer without embedded software, the user may need to run an AZURE IoT provided code sample, which uses the AZURE IoT device SDK, to tests for device to cloud messaging. In another implementation, IoT certification service 10 may communicate with its own set of AZURE IoT Hub instances to automatically validate IoT devices 108 against AZURE IoT Hub bi-directional connectivity and other IoT Hub primitives.

Upon completion of the one or more certification tests 18, IoT certification service 10 may provide a report illustrating each test case run for the certification tests 18. Log files may show the test pass/fail along with raw data sent from the IoT device 108 to the cloud service provider 106 during the certification tests 18. If a test fails, additional diagnosis and/or problem remediation may be necessary in order for a device certification 20 to be provided for the IoT device 108. When all the test cases selected pass, a device certification 20 may be provided for the IoT device 108.

IoT certification service 10 may provide a user experience that is simple and intuitive to users, such as hardware manufacturers, to use. For example, IoT certification service 10 may streamline the process from IoT device 108 registration to running the validations using a simple wizard driven flow. As such, hardware developers may easily troubleshoot failed tests through detailed logs that improves diagnose-ability. Moreover, because IoT certification service 10 may use a web-based workflow, hardware manufacturers are not required to deploy any standalone test kits (no .exe, .msi etc.) locally on their devices, which tend to become outdated over time.

In an implementation, IoT certification service 10 may support the automatic testing and certification of an IoT device 108 for plug and play capabilities. The IoT device 108 may be required to implement basic PnP interfaces 17, such as, but not limited to, Device Information and Declarative Telemetry interface. PnP interfaces 17 may include standard interfaces that may be reused and implemented across a wide variety of devices. In addition, PnP interfaces 17 may include custom PnP interfaces to describe additional capabilities of the device.

IoT certification service 10 may receive information describing the one or more PnP interfaces 17 implemented by the IoT device 108. For example, IoT certification service 10 may query IoT device 108 to determine which PnP interfaces 17 are supported by the IoT device 108. In addition, IoT device 108 may provide IoT certification service 10 a list of PnP interfaces 17 supported by IoT device 108.

IoT certification service 10 may interrogate the IoT device 108 capabilities by invoking methods on the IoT device's 108 PnP interfaces 17. For example, if the IoT device 108 claims to implement Device Management>Rebootinterface method, then IoT certification service 10 will attempt to reboot the IoT device 108 and validate that the IoT device 108 correctly returns last known reboot time. IoT certification service 10 may provide a device certification 20 for plug n play capabilities after verifying the IoT device's 108 plug and play interfaces 17.

In an implementation, IoT certification service 10 may also support the certification of one or more IoT solutions 24 for plug and play. IoT certification service 10 may simulate a PnP capable device being used with the IoT solution 24 selected for certification in order to validate whether the IoT solution 24 consumes PnP interfaces 17 methods exposed by the IoT Hub 107, and if so, IoT certification service 10 may identify the PnP interfaces 17 consumed by IoT solution 24.

IoT certification service 10 may receive information identifying a list of PnP interfaces 17 consumed by the IoT solution 24. For example, developers may provide a list of the PnP interfaces 17 consumed by the IoT solution 24. For solutions authored via a Solutions Deployment Service (SDS) that allows cloud solution developers to author IoT cloud solutions to be published and/or deployed into a users' cloud solutions, this list may be in the form of manifest.xml that's part of the SDS authoring package. As such, cloud solution developers may also be able to publish PnP capabilities at the time they submit their solutions in the form of a metadata (e.g., a manifest file) that points to this interface list.

IoT certification service 10 may instantiate a lightweight simulated IoT device with a unique device ID that implements the exact same interfaces consumed by the IoT solution 24 as provided in the list. To begin the certification test 18, the IoT solution 24 author may be required be add the device ID for the simulated device to the same instance of Azure IoT Hub that the IoT solution 24 will be built on top of. The connecting string for the simulated IoT device is subsequently entered via the IoT certification service 10 user interface.

The IoT solution 24 author may be required to exercise the capabilities of the IoT solution 24 as described in the list. For example, if the solution consumes the DeviceManagement::Reset( ) interface method, the solution author will be required to invoke this interface method on our simulated device instance. IoT certification service 10 may perform book-keeping of exactly what PnP interfaces 17 are being invoked on our simulated device instance in the application service.

Upon passing the certification tests 18, IoT certification service 10 may provide an IoT solution certification 22 for the IoT solution 24.

In an implementation, IoT certification service 10 may support the automatic testing and certification of AZURE IoT EDGE devices. IoT Solution builders expect IoT devices to work out of the box. If an IoT device is certified for IoT EDGE, users may use the IoT device with the reassurance that no additional work may be needed to install the EDGE runtime and use it in a full production environment.

To certify an AZURE IoT EDGE device, IoT certification service 10 may emulate the role of an AZURE IoT EDGE device and subsequently validate basic properties of the AZURE IoT EDGE device, including, but not limited to, operating system version, EDGE runtime version, Moby version, and/or hardware capabilities, via system calls with the cloud service provider 106. The same properties may be obtained via code running on the IoT EDGE runtime. By building all certification related business logic into an EDGE module, better runtime isolation may be provided.

For example, a small lightweight AZURE IoT EDGE certification module may be built with business logic to obtain the runtime and hardware properties described above. The AZURE IoT EDGE module may be published to an application store as a hidden, but public module, and pushed down to the IoT EDGE device through IoT Hub configuration. The AZURE IoT EDGE module may be extended with certification related functionality that is used purely during certification only (i.e., the code will not be part of the software shipped to the customer).

In another implementation, IoT certification service 10 may also support the automatic testing and certification of an IoT EDGE module. Hardware manufacturers and independent software vendor (ISV) partners may develop custom software for IoT EDGE for specific use-cases. As such, the verification and certification of the ISV partners may provide the same level of reliability for these products. For example, to certify an IoT EDGE module, IoT certification service 10 may simulate an AZURE IoT EDGE device with the AZURE IoT EDGE runtime (i.e., IoT EDGE plus certification software pre-installed on VM image running on AZURE).

In an implementation, tooling in Visual Studio (VS) Code may be provided for accessing IoT certification service 10. As such, firmware developers may easily run certification tests 18 directly from Visual Studio or Visual Studio Code.

In an implementation, the information provided by IoT certification service 10 may be used to provide matchmaking between certified IoT devices 28 and one or more IoT solutions 24, allowing customers to easily find the right IoT device for a given business problem and/or business solution. Device catalogs 26 for the cloud service provider 106 may include a list of certified IoT devices 28 along with one or more recommended IoT solutions 24 for use with the certified IoT device 28.

IoT solutions 24 may be recommended for a certified IoT device 28 based at least upon a compatibility score. A compatibility score may be generated that identifies a suitability of a given PnP device with a give PnP solution. Highest rated solutions for a given device and highest rated devices for a given solution, may be the most compatible with one another. The compatibility score may be used to identify which IoT solutions 24 to recommend for the certified IoT devices 28. For example, when IoT devices 28 frequently connect to a PnP solution, recommendations may be provided for popular devices by industry vertical. A PnP compatibility index may define a degree of overlap between the PnP interfaces 17 exposed by an IoT device and those PnP interfaces 17 consumed by an IoT solution. The compatibility score may be based at least upon the combination of the PnP compatibility index and user provided ratings.

The expanded information provided the device catalog 26 may showcase the right set of IoT devices for a users' industry specific vertical solutions and/or to simplify IoT device development.

As such, IoT certification service 10 may significantly reduce the operational processes and/or engineering costs for hardware manufacturers to certify their IoT devices 108 for use with a cloud service provider 106. In addition, IoT certification service 10 may improve the discovery of certified devices in an IoT device catalog.

Figure 2:
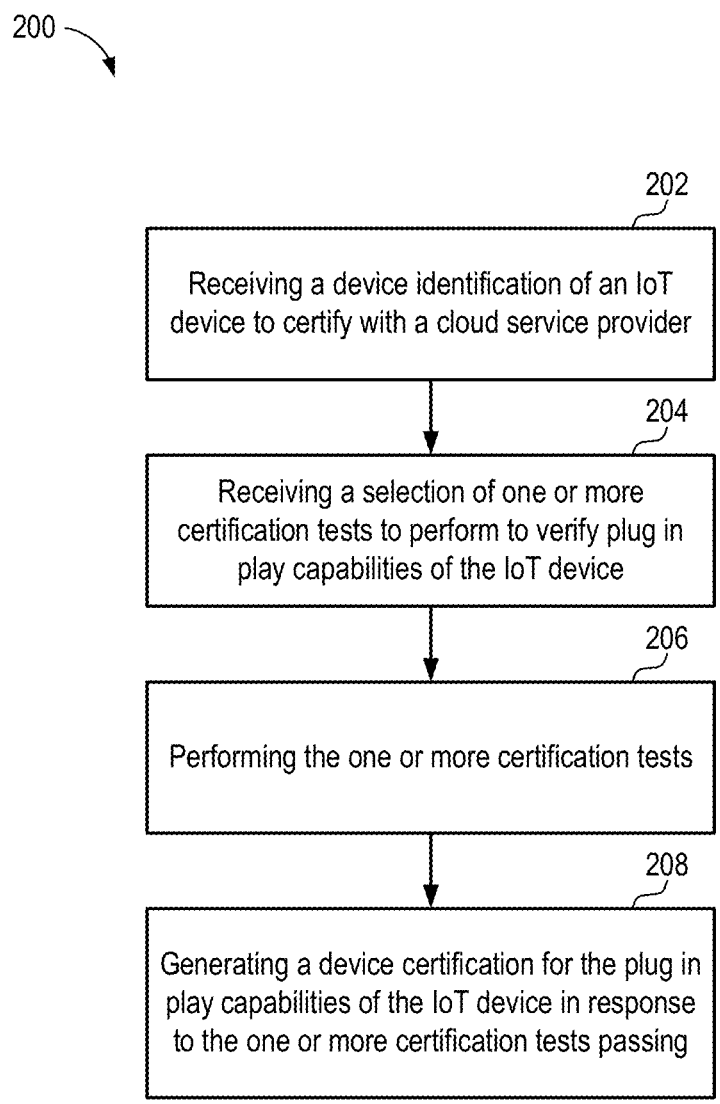
FIG. 2 is an example method for an automated IoT certification service to verify plug and play capabilities of one or more IoT devices for use with a cloud service provider in accordance with an implementation.

Referring now to FIG. 2, illustrated is an example method 200 that may be used for an automated IoT certification service 10 (FIG. 1) to verify plug and play capabilities of one or more IoT devices 108 (FIG. 1) for use with a cloud service provider 106 (FIG. 1) is discussed in connection with the description of the architecture of FIG. 1.

At 202, method 200 may include receiving a device identification of an IoT device to certify with a cloud service provider. For example, IoT certification service 10 may receive one or more device identifications IDs 14 of one or more IoT device 108 to certify. For example, a hardware manufacturer or distributor may want to certify an IoT device 108, such as, a field gateway device or an IoT capable leaf device. A user may select one or more device IDs 14 for testing through a dashboard interface of IoT certification service 10 and/or may input the device IDs 14 through the dashboard interface.

At 204, method 200 may include receiving a selection of one or more certification tests to perform to verify plug and play capabilities of the IoT device. IoT certification service 10 may customize the one or more certification tests 18 performed on the IoT devices 108. For example, a user may select which certification tests 18 the user wants run on the selected IoT device 108. IoT certification service 10 may receive testing parameters 16 that identify one or more device capabilities for the selected certification tests 18. Testing parameters 16 may include, but are not limited to, a selection of operating systems supported by the IoT devices, device twin properties of the IoT devices, a selection of device messaging to test (e.g., device-to-cloud messaging, cloud-to-device messaging, and direct method messaging from the device), and/or a number of messages of telemetry data sent from the IoT devices.

Testing parameters 16 may also include one or more PnP interfaces 17 (up to r, where r is an integer) provided by IoT devices 108 and/or used by IoT solutions 24. IoT certification service 10 may receive information describing the one or more PnP interfaces 17 implemented by the IoT device 108. For example, IoT certification service 10 may query IoT device 108 to determine which PnP interfaces 17 are supported by the IoT device 108. In addition, IoT device 108 may provide IoT certification service 10 a list of PnP interfaces 17 supported by IoT device 108.

In an implementation, IoT certification service 10 may also support the certification of one or more IoT solutions 24 for plug and play. For example, IoT certification service 10 may select one or more certification tests 18 to perform on the IoT solutions 24.

IoT certification service 10 may receive information identifying a list of PnP interfaces 17 consumed by the IoT solution 24. For example, developers may provide a list of the PnP interfaces 17 consumed by the IoT solution 24. For solutions authored via a Solutions Deployment Service (SDS) that allows cloud solution developers to author IoT cloud solutions to be published and/or deployed into a users' cloud solutions, this list may be in the form of manifest.xml that's part of the SDS authoring package. As such, cloud solution developers may also be able to publish PnP capabilities at the time they submit their solutions in the form of a metadata (e.g., a manifest file) that points to this interface list.

At 206, method 200 may include performing the one or more certification tests. IoT certification service 10 may interrogate the IoT device 108 capabilities by invoking methods on the IoT device's 108 PnP interfaces 17. For example, if the IoT device 108 claims to implement Device Management>Rebootinterface method, then IoT certification service 10 will attempt to reboot the IoT device 108 and validate that the IoT device 108 correctly returns last known reboot time.

IoT certification service 10 may also simulate a PnP capable device being used with the IoT solution 24 selected for certification in order to validate whether the IoT solution 24 consumes PnP interfaces 17 methods exposed by the IoT Hub 107, and if so, IoT certification service 10 may identify the PnP interfaces 17 consumed by IoT solution 24. For example, IoT certification service 10 may instantiate a lightweight simulated IoT device with a unique device ID that implements the exact same interfaces consumed by the IoT solution 24 as provided in the list. To begin the certification test 18, the IoT solution 24 author may be required be add the device ID for the simulated device to the same instance of Azure IoT Hub that the IoT solution 24 will be built on top of. The connecting string for the simulated IoT device is subsequently entered via the IoT certification service 10 user interface.

IoT certification service 10 may communicate with its own set of IoT hubs 107 to perform the one or more certification tests. For example, IoT certification service 10 may automatically validate IoT devices 108 to the IoT hubs 107 bi-directional connectivity and/or other IoT hubs 107 primitives. The embedded firmware on the IoT device 108 may need to be recompiled to point to the IoT Hub 107 instance via, for example, the connection string.

At 208, method 200 may include generating a device certification for the plug and play capabilities of the IoT device in response to the one or more certification tests passing.

IoT certification service 10 may provide a report illustrating each test case run for the certification tests 18. Log files may show the test pass/fail along with raw data sent from the IoT device 108 to the cloud service provider 106 during the certification tests 18. If a test fails, additional diagnosis and/or problem remediation may be necessary in order for a device certification 20 to be provided for the IoT device 108. When all the test cases selected pass, a device certification 20 may be generated for the IoT device 108. For example, IoT certification service 10 may provide a device certification 20 for plug n play capabilities after verifying the IoT device's 108 plug and play interfaces 17. In addition, IoT certification service 10 may provide an IoT solution certification 22 for the IoT solution 24.

Another implementation may include a method that may be used by computer device 102 (FIG. 1) for accessing an automated IoT certification service 10 (FIG. 1) to verify compatibility of one or more IoT devices 108 (FIG. 1) for use with a cloud service provider 106 (FIG. 1) is discussed in connection with the description of the architecture of FIG. 1.

The method may include transmitting, to the IoT certification service, a device identification of an IoT device to certify the IoT device with a cloud service provider; transmitting, to the IoT certification service, a selection of one or more certification tests to perform to verify that the IoT device is operable with the cloud service provider; and receiving, from the IoT certification service, a device certification for the IoT device with the cloud service provider in response to the one or more certification tests passing.

In addition, the method may include transmitting, to the IoT certification service, an IoT solution to certify; and receiving, from the IoT certification service, an IoT solution certification for the IoT solution in response to the one or more certification tests passing when performed on the IoT solution using a simulated IoT device to verify the use of the IoT solution with one or more device interfaces.

The method may also include transmitting, to the IoT certification service, one or more plug and play interfaces implemented by the IoT device; and receiving, from the IoT certification service, the device certification for the plug and play capabilities in response to the one or more certification tests passing on the one or more plug and play interfaces to verify the use of the one or more plug and play interfaces by the IoT device.

The method may also include receiving at least one recommended IoT solution for the IoT device, wherein the at least one recommended IoT solution is identified using a compatibility score that identifies a degree of overlap between interfaces exposed by the IoT device and interfaces consumed by the at least one recommended IoT solution.

As such, the methods may provide a user experience that is simple and intuitive to users, such as, hardware manufacturers, to use. For example, the methods may streamline the process from IoT device 108 registration to running the validations using a simple wizard driven flow. As such, hardware developers may easily troubleshoot failed tests through detailed logs that improves diagnose-ability. Moreover, because IoT certification service 10 may use a web-based workflow, hardware manufacturers are not required to deploy any standalone test kits (no .exe, .msi etc.) locally on their devices, which tend to become outdated over time.

Figure 3:
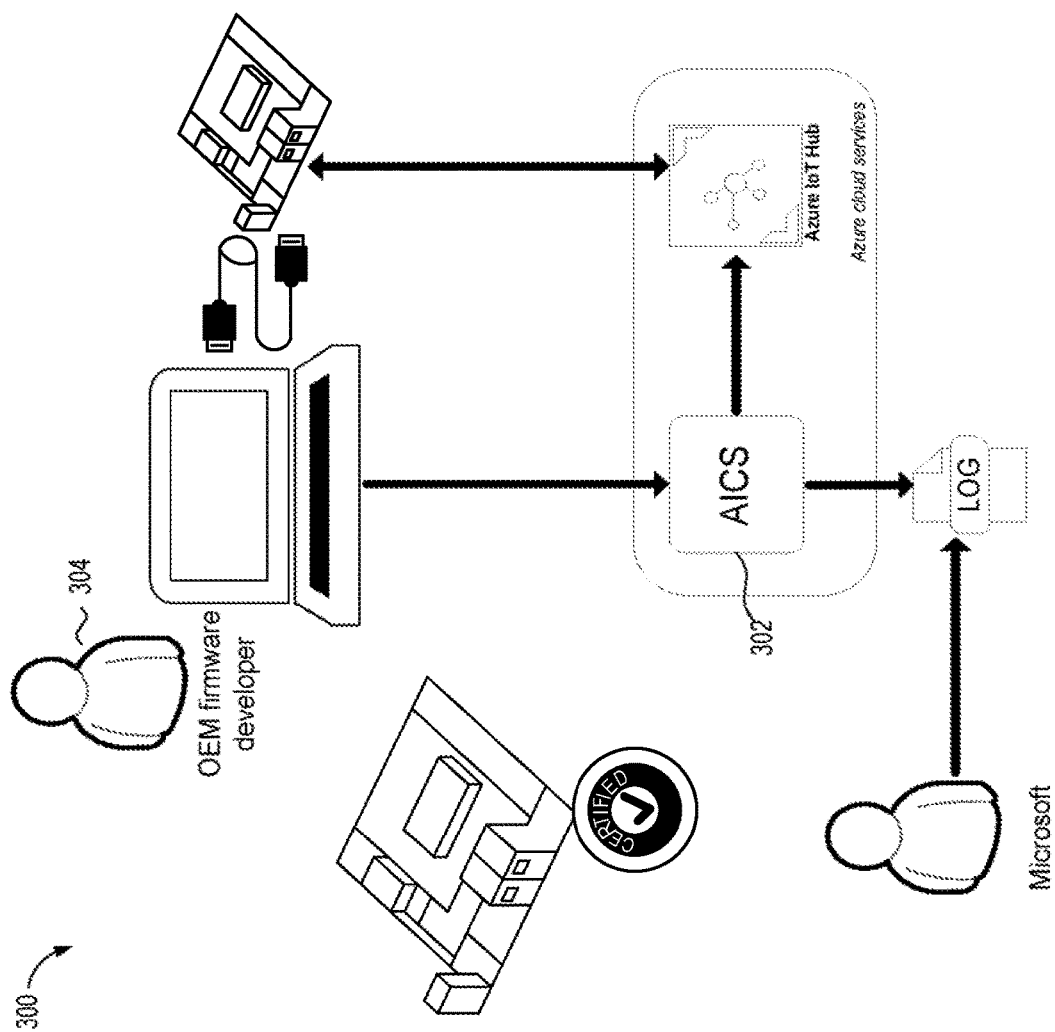
FIG. 3 is an example system architecture for use with an IoT certification service in accordance with an implementation.

Referring now to FIG. 3, an example system architecture 300 for use with the IoT certification service 10 (Fig.) discussed in FIG. 1 may include the entire business logic for AZURE IoT certification service (AICS) 302, which may correspond to the IoT certification service 10, and may run as a multi-tenant Azure service built on Azure Application Service as the backend with a web-based front-end. AICS 302 may not communicate directly with the IoT device 108, but instead may use the Azure IoT administration/management SDK to exercise the device capabilities chosen by the hardware manufacturer 304.

Figure 4A:
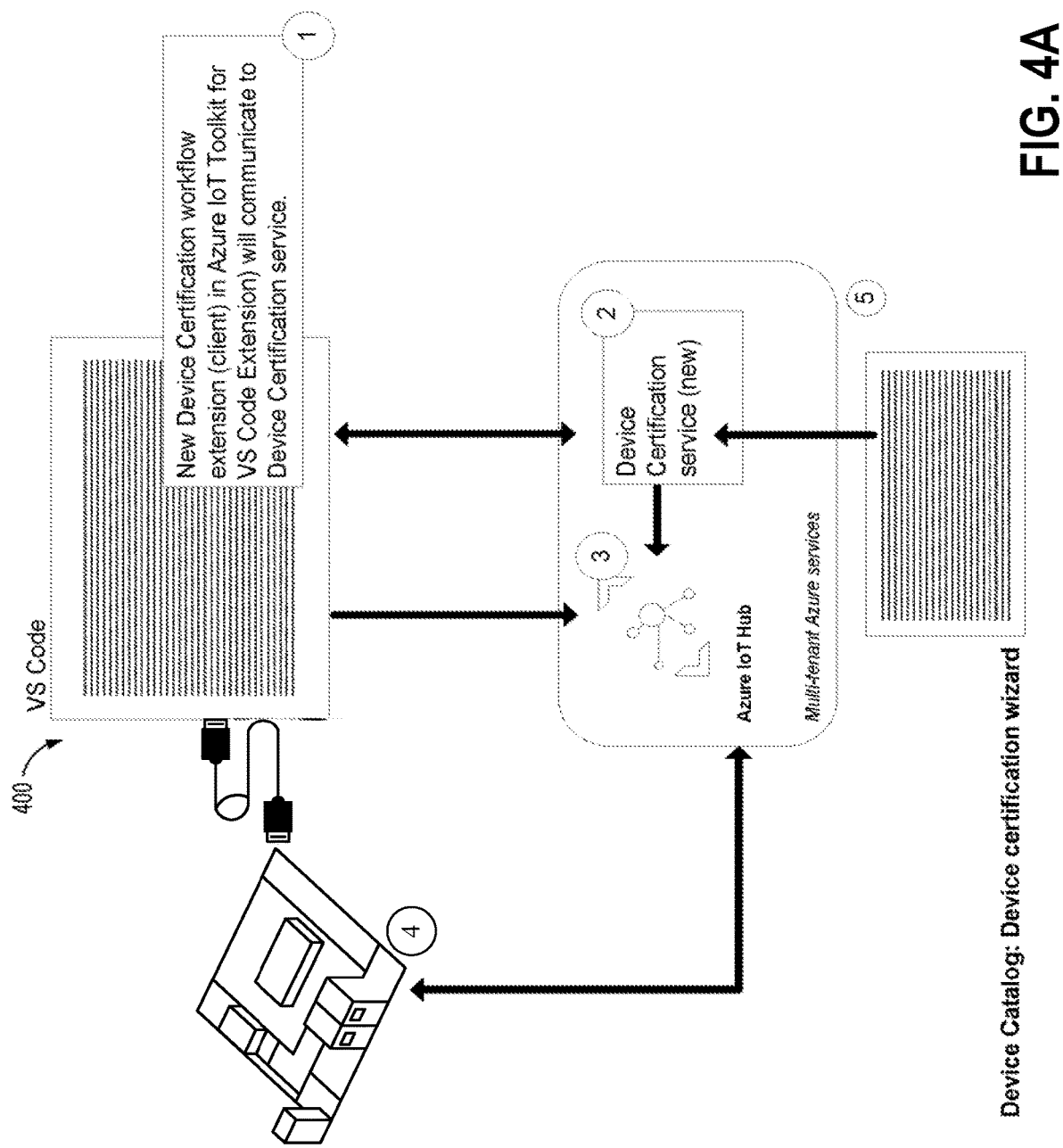
FIGS. 4A and 4B illustrate accessing an IoT certification service from an development environment in accordance with an implementation.
Figure 4B:
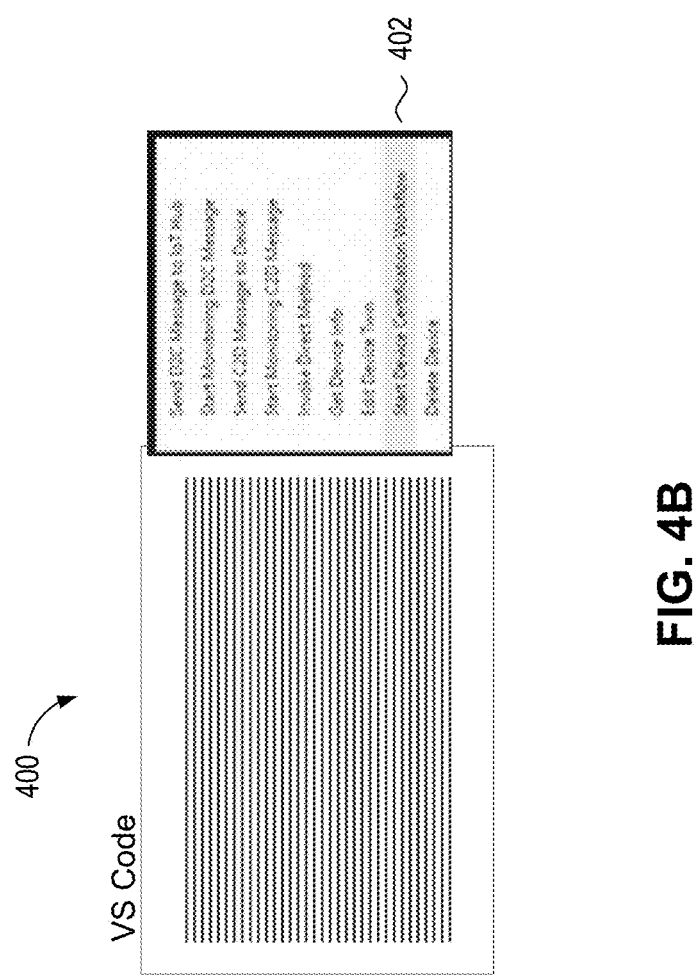

Referring now to FIGS. 4A and 4B, illustrated is an example of extending the IoT certification service 10 (FIG. 1) to a development environment 400, such as, VISUAL STUDIO and/or VISUAL STUDIO CODE. For example, a hardware manufacturer may invoke the IoT certification service 10 discussed in FIG. 1, directly from development environments 400. As such, tooling 402 in the VISUAL STUDIO and VISUAL STUDIO CODE for embedded firmware developers may provide the capability to easily run certification tests.

Figure 5A:
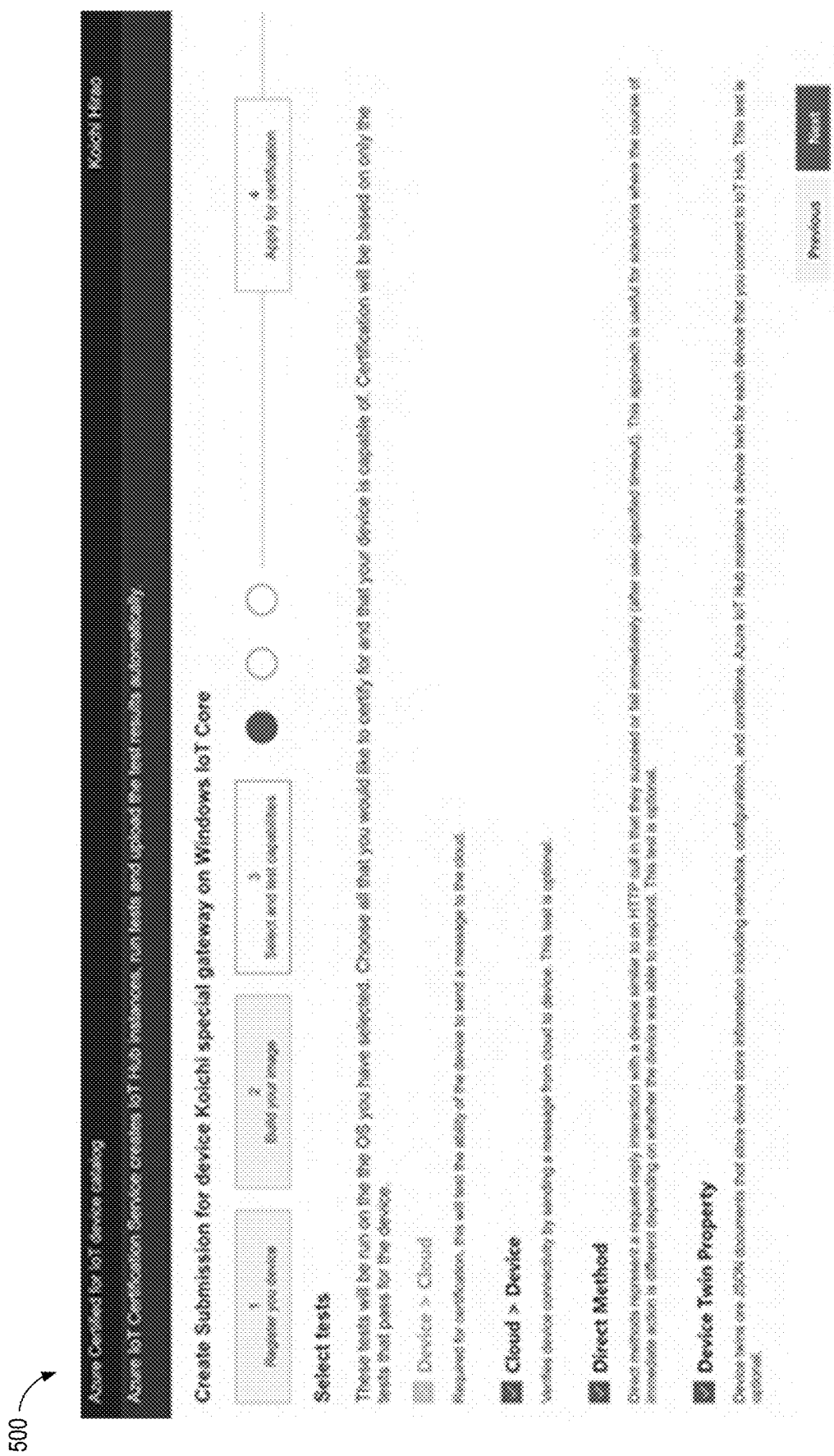
FIGS. 5A-5C illustrate example user interfaces for use with the IoT certification service.
Figure 5B:
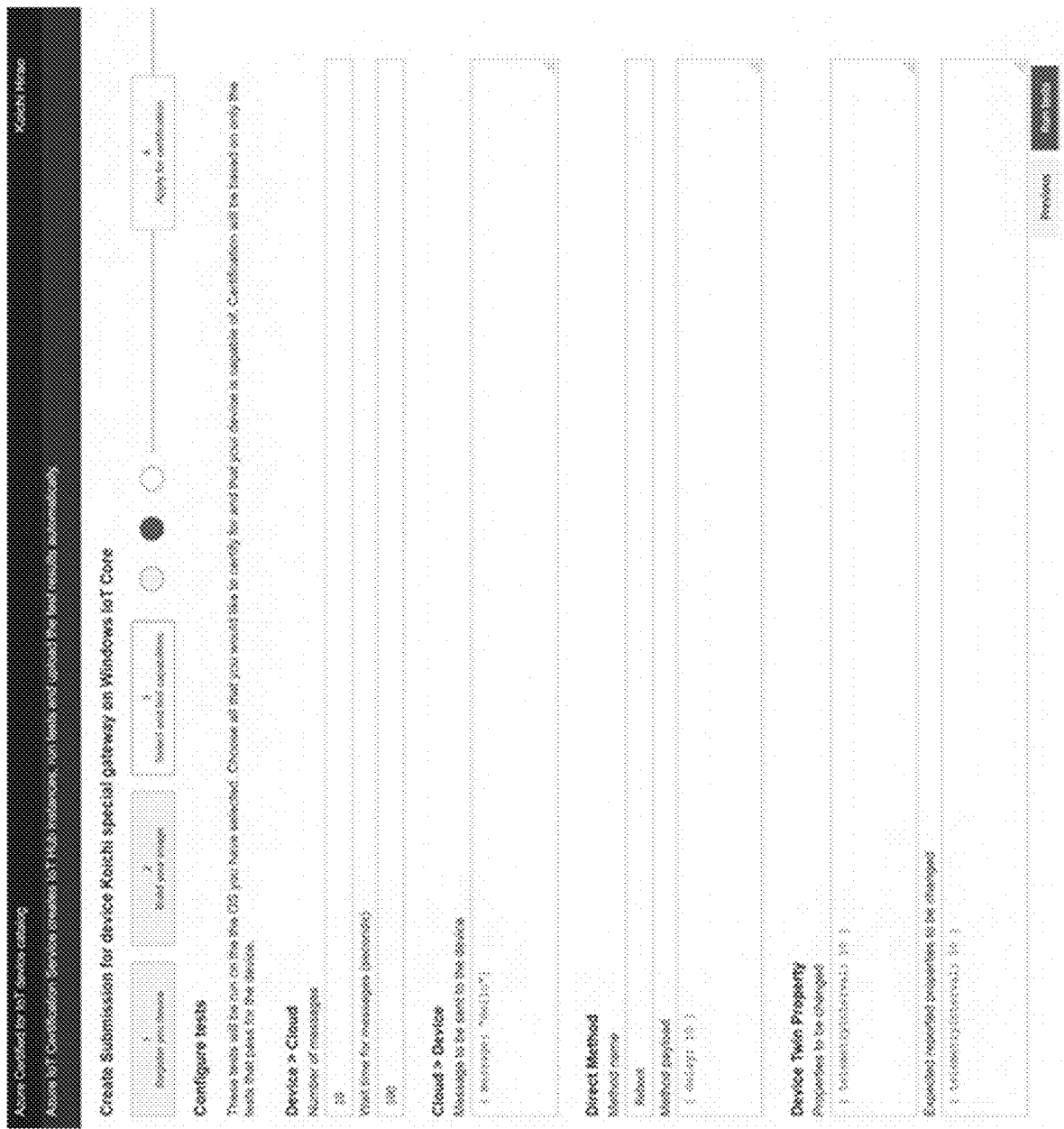
Figure 5C:
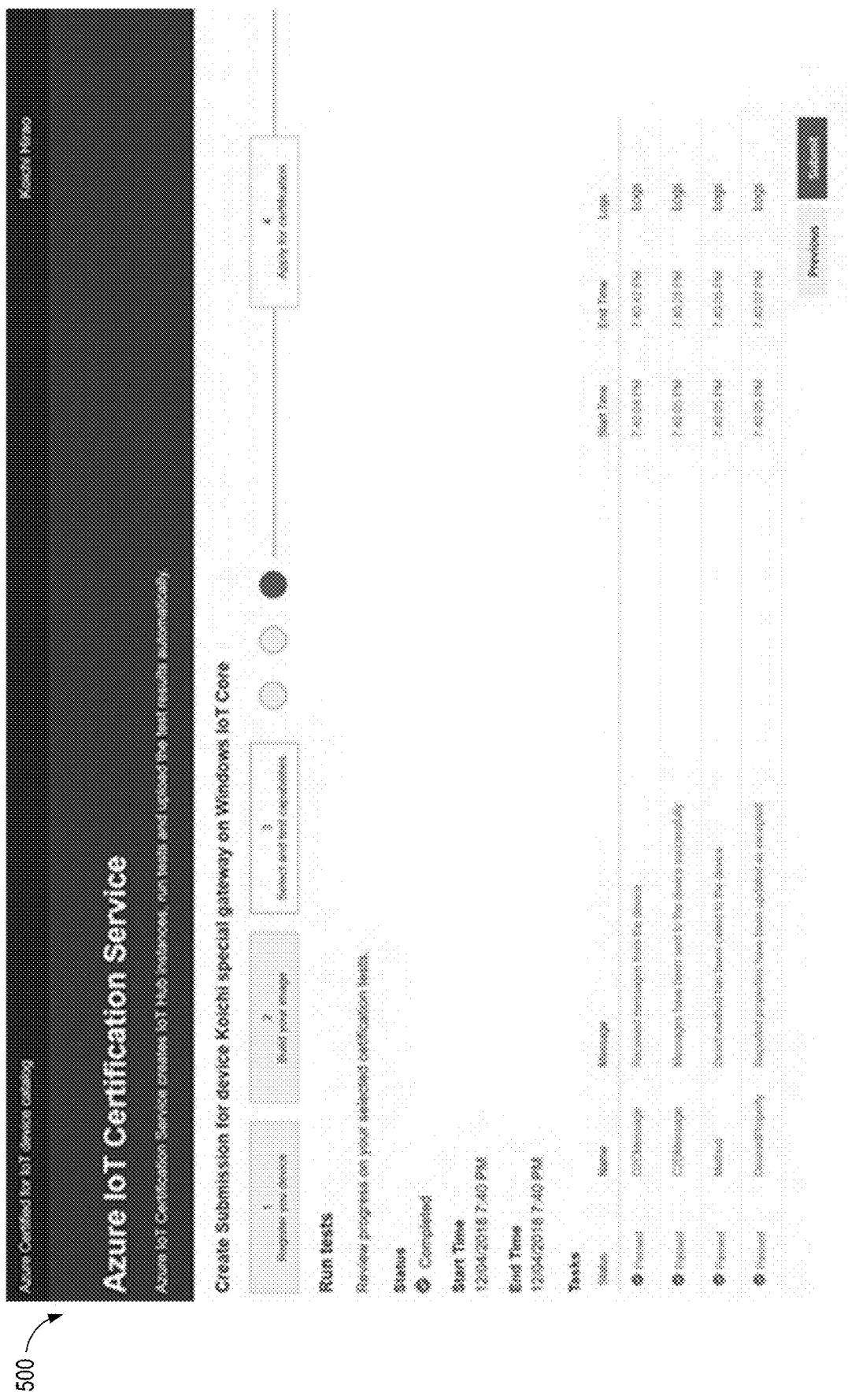

Referring now to FIGS. 5A-5C, illustrated is an example user interface 500 for use with the IoT certification service 10 (FIG. 1). FIG. 5A illustrates an example of selecting the certification tests 18 (FIG. 1) to perform on the IoT device 108 (FIG. 1). Interface 500 shows customizable certification tests 18. By default, device-to-cloud is the required test and all others may be optional. This new requirement allows constrained devices such as microcontrollers to be certified.

FIG. 5B illustrates an example of configuring the certification tests 18 (FIG. 1) to perform. FIG. 5C illustrates an example report with the status (e.g., pass or fail) of the certification tests 18 performed. For example, interface 500 shows each test case run. Log files show the test pass/fail along with raw data sent from the IoT device 108 to the cloud. The submit button only shows up when all the test cases selected pass.

Figure 6:
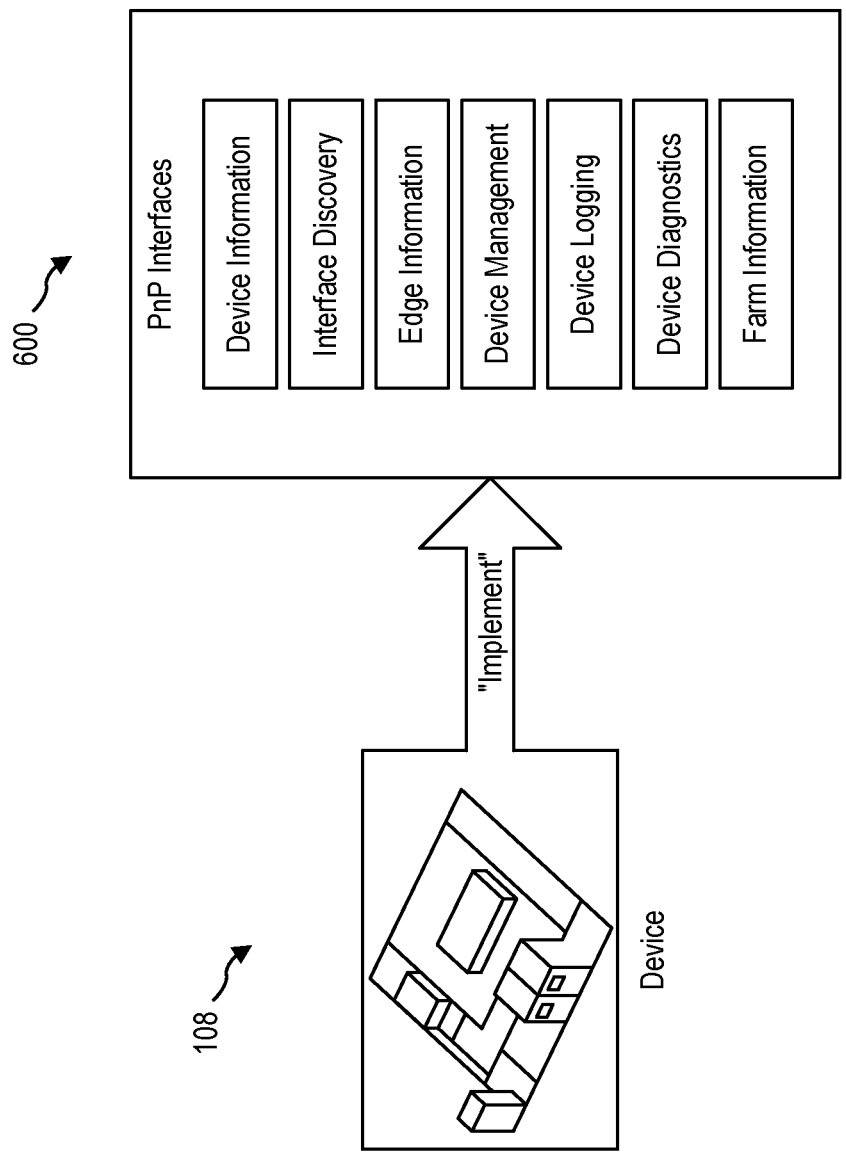
FIG. 6 illustrates example plug and play interfaces implemented by an IoT device in accordance with an implementation.

Referring now to FIG. 6, illustrated is an example list 600 of plug and play interfaces 17 implemented by IoT device 108. List 600 may include the various plug and play interfaces 17 supported by IoT device 108. For example, IoT certification service 10 may query IoT device 108 to determine which PnP interfaces 17 are supported by the IoT device 108. IoT certification service 10 may interrogate the IoT device 108 capabilities by invoking methods on the IoT device's 108 PnP interfaces 17. For example, if the IoT device 108 claims to implement Device Management>Rebootinterface method, then IoT certification service 10 will attempt to reboot the IoT device 108 and validate that the IoT device 108 correctly returns last known reboot time. In addition, IoT device 108 may provide IoT certification service 10 a list of PnP interfaces 17 supported by IoT device 108. Thus, list 600 may vary between IoT devices 108 depending on which PnP interfaces 17 may be supported by IoT device 108.

Figure 7:
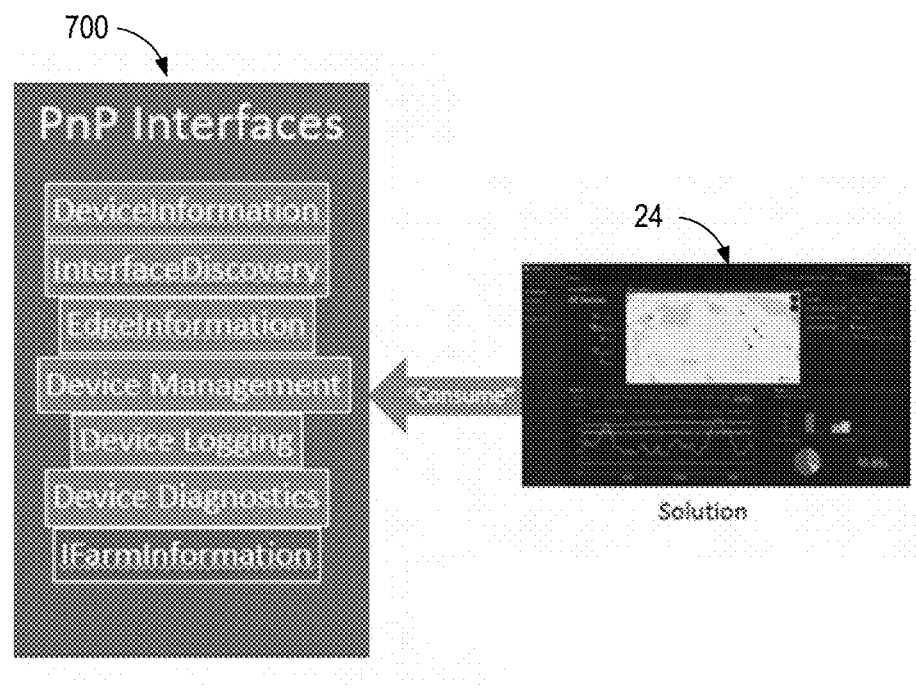
FIG. 7 illustrates example plug and play interfaces implemented by an IoT solution in accordance with an implementation.

Referring now to FIG. 7, illustrated is an example list 700 of plug and play interfaces 17 implemented by an IoT solution 24. PnP interfaces 17 may be included in list 700 in response to IoT certification service 10 simulating a PnP capable device being used with the IoT solution 24 in order to validate whether the IoT solution 24 consumes PnP interfaces 17 methods exposed by the IoT Hub 107. If IoT solution 24 uses PnP interfaces 17, IoT certification service 10 may include the PnP interfaces 17 used by IoT solution 24 in List 700. As such, the PnP interfaces 17 may automatically be included in list 700 in response to IoT certification service 10 simulating a PnP capable device.

In addition, PnP interfaces 17 may be included in list 700 in response to information identifying a list of PnP interfaces 17 consumed by the IoT solution 24. For example, developers may provide a list of the PnP interfaces 17 used by the IoT solution 24. Cloud solution developers may also be able to publish PnP capabilities at the time they submit their solutions in the form of a metadata (e.g., a manifest file) that points to this interface list 700. As such, list 700 of PnP interfaces 17 may vary between IoT solutions 24 based on which PnP interfaces 17 an IoT solution 24 may use or may not use.

Figure 8:
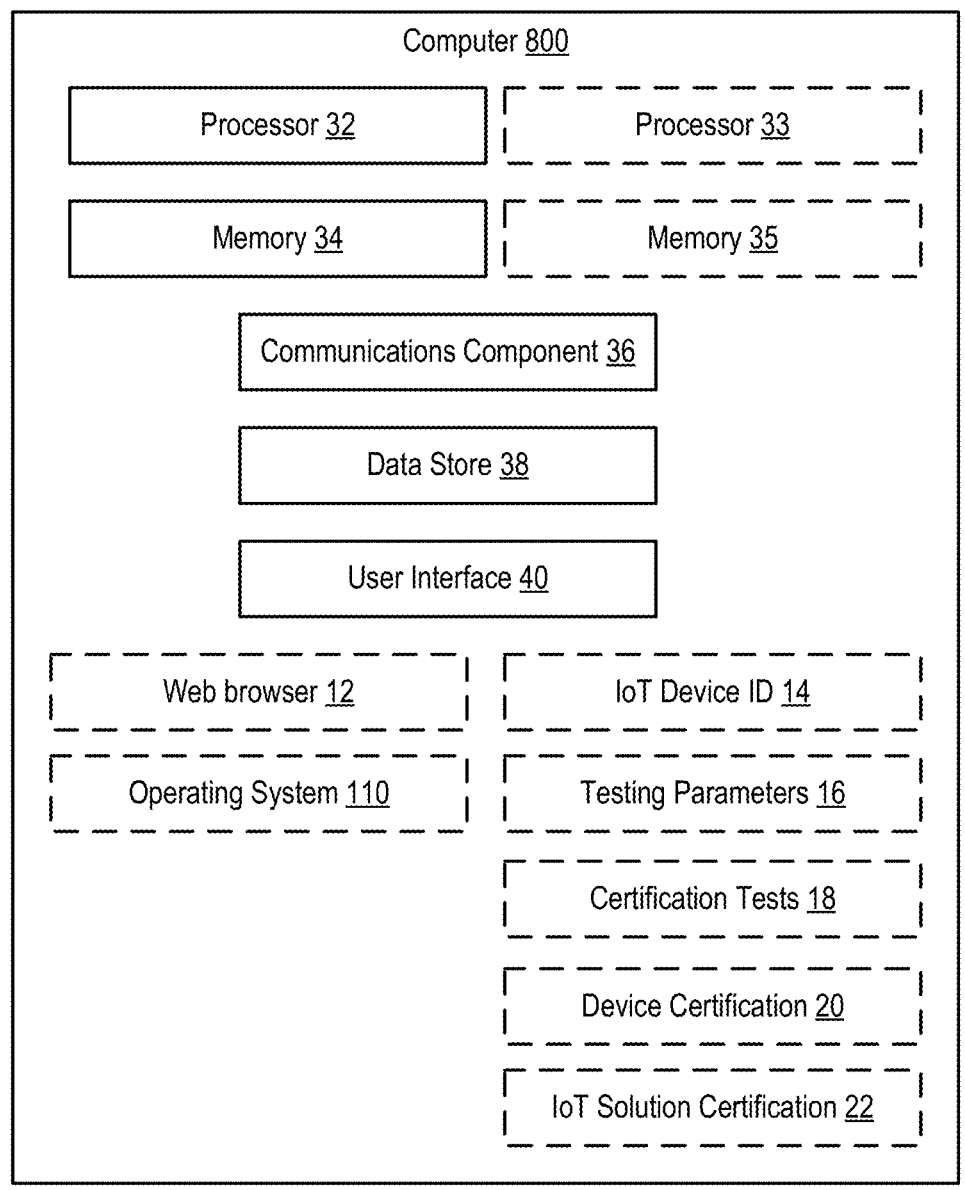
FIG. 8 is a schematic block diagram of an example device in accordance with an implementation of the present disclosure.

Referring now to FIG. 8, illustrated is an example computer 800 that may be configured as computer device 102 or as IoT certification service 10 in accordance with an implementation, including additional component details as compared to FIG. 1. In one example, computer 800 may include processors 32 or processors 33 for carrying out processing functions associated with one or more of components and functions described herein. Processor 32 or processor 33 can include a single or multiple set of processors or multi-core processors. Moreover, processor 32 or processor 33 can be implemented as an integrated processing system and/or a distributed processing system.

Computer 800 may further include memory 34 or memory 35, such as for storing local versions of applications being executed by processor 32 or processor 33. Memory 34 or memory 35 can include a type of memory usable by a computer, such as random access memory (RAM), read only memory (ROM), tapes, magnetic discs, optical discs, volatile memory, non-volatile memory, and any combination thereof. Additionally, processor 32 and memory 34 may include and execute operating system 110 (FIG. 1).

Further, computer 800 may include a communications component 36 that provides for establishing and maintaining communications with one or more parties utilizing hardware, software, and services as described herein. Communications component 36 may carry communications between components on computer device 102, IoT certification service 10, as well as between computer device 102, IoT certification service 10, and external devices, such as devices located across a communications network and/or devices serially or locally connected to computer device 102 and/or IoT certification service 10. For example, communications component 36 may include one or more buses, and may further include transmit chain components and receive chain components associated with a transmitter and receiver, respectively, operable for interfacing with external devices.

Additionally, computer 800 may include a data store 38, which can be any suitable combination of hardware and/or software, that provides for mass storage of information, databases, and programs employed in connection with implementations described herein. For example, data store 38 may be a data repository for web browser(s) 12, IoT device IDs 14, testing parameters 16, certification tests 18, device certifications 20, and/or IoT solution certifications 22.

Computer 800 may also include a user interface component 40 operable to receive inputs from a user of computer device 102 and further operable to generate outputs for presentation to the user. User interface component 40 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 40 may include one or more output devices, including but not limited to a display, a speaker, a haptic feedback mechanism, a printer, any other mechanism capable of presenting an output to a user, or any combination thereof.

In an implementation, user interface component 40 may transmit and/or receive messages corresponding to the operation of web browser 12. In addition, processors 32, 33 execute web browser 12, IoT device IDs 14, testing parameters 16, certification tests 18, device certifications 20, and/or IoT solution certifications 22, and memories 34, 35 or data store 46 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:
1. A computer device, comprising:
a memory to store data and instructions;
a processor in communication with the memory, wherein the processor is configured to execute an Internet of Things (IoT) certification service configured to:
receive a device identification of an IoT device to certify with a cloud service provider;

send a query to the IoT device to determine a list of one or more plug and play interfaces supported by the IoT device;

receive a selection of one or more certification tests to perform to verify plug and play capabilities of the IoT device in response to the query identifying the one or more plug and play interfaces supported by the IoT device;

perform the one or more certification tests on the one or more plug and play interfaces to verify a use of the one or more plug and play interfaces by the IoT device; and generate a device certification for the plug and play capabilities of the IoT device with the cloud service provider in response to the one or more certification tests passing, wherein the IoT device is associated with at least one recommended IoT solution based on the device certification for the plug and play capabilities of the IoT device and a compatibility score of the IoT device and the at least one recommended IoT solution.

2. The computer device of claim 1, wherein the IoT certification service is further configured to receive the one or more plug and play interfaces implemented by the IoT device from at least one of the IoT device or the IoT certification service interrogating the IoT device.

3. The computer device of claim 1, wherein the compatibility score identifies a degree of overlap between one or more plug and play device interfaces exposed by the IoT device and one or more plug and play device interfaces consumed by the at least one recommended IoT solution.

4. The computer device of claim 1, wherein the IoT certification service is accessed directly from a development environment.

5. The computer device of claim 1, wherein the IoT certification service is further configured to:
receive a plug and play IoT solution to certify;
identify one or more plug and play interfaces the IoT solution consumes; and
instantiate a simulated IoT device that implements the one or more plug and play interfaces.

6. The computer device of claim 5, wherein the IoT certification service is further configured to:
perform the one or more certification tests on the IoT solution using the simulated IoT device to verify a use of the IoT solution with the one or more plug and play interfaces; and
generate an IoT solution certification for the IoT solution in response to the one or more certification tests passing.

7. The computer device of claim 5, wherein the IoT certification service is further configured to identify the one or more plug and play interfaces the IoT solution consumes by at least one of simulating a plug and play capable device or receiving information identifying the one or more plug and play interfaces.

8. The computer device of claim 1, wherein the plug and play interfaces include standard interfaces implemented across a variety of IoT devices or custom interfaces that describe additional capabilities of the IoT device.

9. The computer device of claim 1, wherein the IoT certification service is further configured to:
send the device certification for presentation in a device catalog, wherein the device catalog includes a list of certified IoT devices along with device capabilities of the list of certified IoT devices, the one or more certification tests performed on the list of certified IoT devices, and the at least one recommended IoT solution for use with the list of certified IoT devices.

10. The computer device of claim 1, wherein the compatibility score is based on a frequency of IoT devices connecting to the at least one recommended IoT solution.

11. A method for an automated Internet of Things (IoT) certification service to verify plug and play capabilities of one or more IoT devices for use with a cloud service provider, comprising:
receiving a device identification of an IoT device to certify with the cloud service provider;
send a query to the IoT device to determine a list of one or more plug and play interfaces supported by the IoT device;
receiving a selection of one or more certification tests to perform to verify plug and play capabilities of the IoT device in response to the query identifying the one or more plug and play interfaces supported by the IoT device;
performing the one or more certification tests on the one or more plug and play interfaces to verify a use of the one or more plug and play interfaces by the IoT device; and
generating a device certification for the plug and play capabilities of the IoT device with the cloud service provider in response to the one or more certification tests passing, wherein the IoT device is associated with at least one recommended IoT solution based on the device certification for the plug and play capabilities of the IoT device and a compatibility score of the IoT device and the at least one recommended IoT solution.

12. The method of claim 11, wherein the one or more plug and play interfaces implemented by the IoT device are received from at least one of the IoT device or the IoT certification service interrogating the IoT device.

13. The method of claim 11, wherein the at least one recommended IoT solution is identified using a compatibility score that identifies a degree of overlap between one or more plug and play device interfaces exposed by the IoT device and one or more plug and play device interfaces consumed by the at least one recommended IoT solution.

14. The method of claim 11, wherein the IoT certification service is accessed directly from a development environment.

15. The method of claim 11, further comprising:
receiving a plug and play IoT solution to certify;
identifying one or more plug and play interfaces the IoT solution consumes; and
instantiating a simulated IoT device that implements the one or more plug and play interfaces.

16. The method of claim 15, further comprising:
performing the one or more certification tests on the IoT solution using the simulated IoT device to verify a use of the IoT solution with the one or more plug and play interfaces; and
generating an IoT solution certification for the IoT solution in response to the one or more certification tests passing.

17. The method of claim 15, wherein the one or more plug and play interfaces the IoT solution consumes are identified by at least one of simulating a plug and play capable device or receiving information identifying the one or more plug and play interfaces.

18. A non-transitory computer-readable medium storing instructions executable by a computer device, comprising:

at least one instruction for causing the computer device to receive a device identification of an IoT device to certify with a cloud service provider;

at least on instruction for causing the computer device to send a query to the IoT device to determine a list of one or more plug and play interfaces supported by the IoT device;

at least one instruction for causing the computer device to receive a selection of one or more certification tests to perform to verify plug and play capabilities of the IoT device in response to the query identifying the one or more plug and play interfaces supported by the IoT device;

at least one instruction for causing the computer device to perform the one or more certification tests on the one or more plug and play interfaces to verify a use of the one or more plug and play interfaces by the IoT device; and at least one instruction for causing the computer device to generate a device certification for the plug and play capabilities of the IoT device with the cloud service provider in response to the one or more certification tests passing, wherein the IoT device is associated with at least one recommended IoT solution based on the device certification for the plug and play capabilities of the IoT device and a compatibility score of the IoT device and the at least one recommended IoT solution.

* * * * *